May 14, 1968
J. VINCE
3,383,037
ELECTRICAL APPARATUS
Filed Sept. 29, 1965
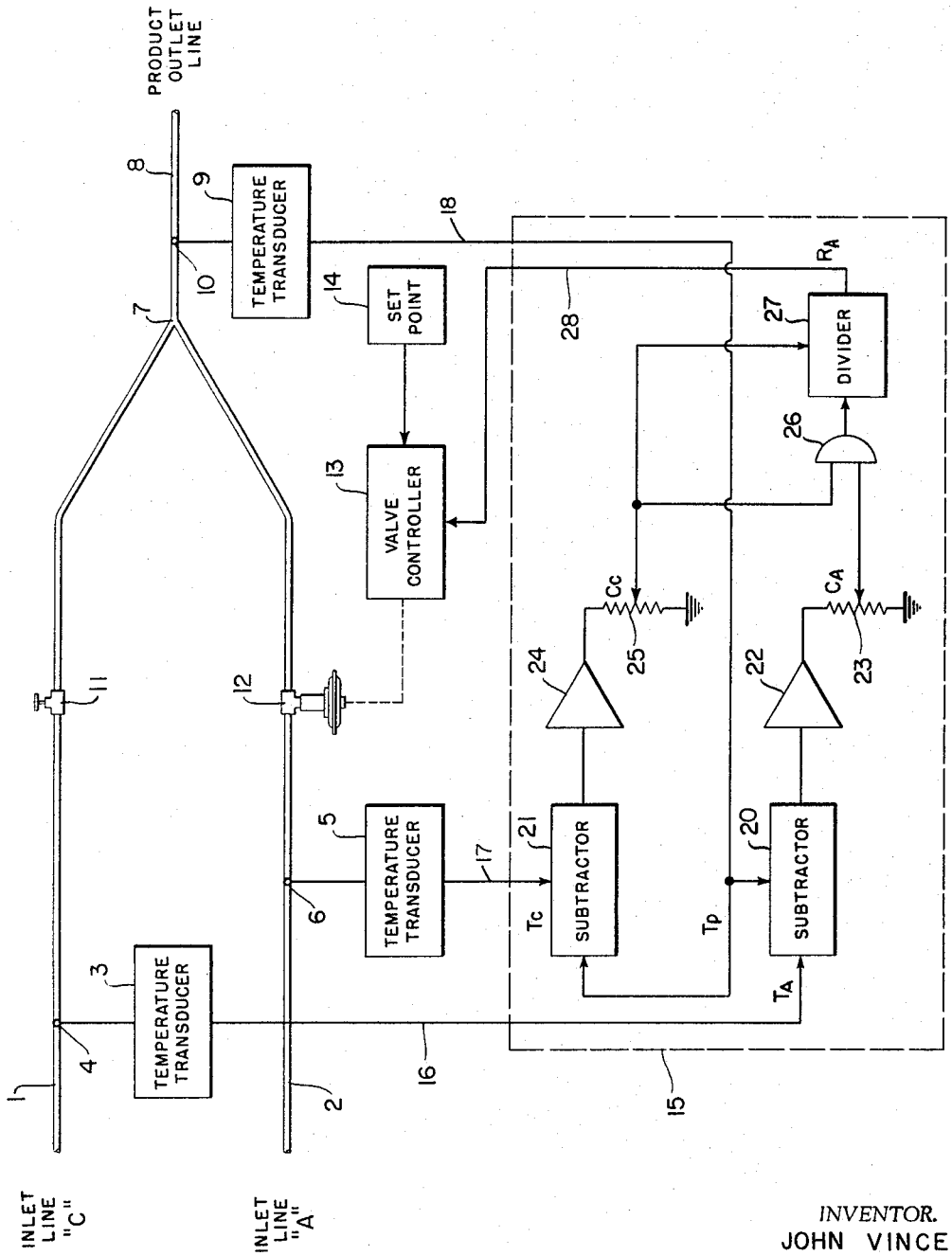
INVENTOR.
JOHN VINCE
BY Arthur N. Swanson
ATTORNEY.

3,383,037
ELECTRICAL APPARATUS
John Vince, Lansdale, Pa., assignor to Honeywell Inc., Minneapolis, Minn., a corporation of Delaware
Filed Sept. 29, 1965, Ser. No. 491,263
7 Claims. (Cl. 236—12)

ABSTRACT OF THE DISCLOSURE

A fluid ratio blending system is operative to control the ratio of two constituent fluids in a product fluid by means of a control action on only one of the constituent fluids. The control is effected by means of measuring the temperature of the constituent fluids and the product fluid and regulation of the one constituent fluid.

---

The present invention relates to flow control systems. More specifically, the present invention relates to a fluid ratio blending apparatus.

An object of the present invention is to provide an improved fluid ratio blending apparatus.

Another object of the present invention is to provide an improved fluid ratio blending system operating without using a direct measurement of fluid flow.

A further object of the present invention is to provide an improved fluid ratio blending system using only a measurement of the temperatures of the constituent and product fluids.

Still another object of the present invention is to provide an improved fluid ratio blending system for fluids having different temperatures and specific heats.

A still further object of the present invention is to provide an improved fluid ratio blending system for controlling the ratio of two constituent fluids in a product fluid through a control action on only one of the constituent fluids.

In accomplishing these and other objects, there has been provided, in accordance with the present invention, a fluid ratio blending system comprising a first inlet fluid temperature measuring transducer, a second inlet fluid temperature measuring transducer and a product fluid temperature measuring transducer. A ratio analog computing apparatus is arranged to compute the ratio, or percent, of one of the inlet fluids to maintain a desired, or setpoint, ratio of the inlet fluids in a product fluid. The computed output signal is applied to a valve controller to control the amount of the controlled fluid to be admitted to form the product fluid.

A better understanding of the present invention may be had when the following description is read in connection with the accompanying drawing in which the single figure is a pictorial block diagram of a ratio blending system embodying the present invention.

Referring to the single figure drawing in more detail, there is shown a first fluid inlet line 1 for carrying an incoming fluid which is to be mixed with a second fluid in a predetermined ratio. The second fluid is carried in a second inlet line 2. A first temperature measuring transducer 3 having a temperature measuring element 4 in the line 1 is arranged to measure the temperature of the first incoming fluid. A second temperature measuring transducer 5 having a temperature measuring element 6 in the line 2 is arranged to measure the temperature of the second incoming fluid.

The fluids in the inlet lines 1 and 2 are combined at a junction 7 and fed into an output product line 8. A third temperature measuring transducer 9 having a temperature measuring element 10 in the outlet line 8 is arranged to measure the temperature of the combined product in the outlet line 8.

A manual valve 11 is located in the first line 1 to provide a means for setting the flow in line 1. An automatically controlled valve 12 controlled by a typical valve controller 13 is located in the second line 2. The controller 13 is arranged to control the valve 12 in response to an error signal derived from a comparison of two input signals. A first input signal for the controller 13 is obtained from a set-point means 14. The other controller input signal is obtained from a ratio computer 15. The ratio computer 15 is effective to compute an existing ratio of the combined inlet fluids using the measured temperatures from the temperature transducers 3, 5 and 9 as described hereinafter. Thus, a signal representing the temperature of the first inlet line fluid is supplied via signal line 16 to the computer 15. Similarly, a signal line 17 is connected to the output of the transducer 5, and a line 18 is connected to the transducer 9. Signal lines 17 and 18 are utilized to supply signals to computer 15.

The details of the ratio computer 15 are shown in the drawing in a block diagram schematic. The output signals from the temperature transducers 3 and 5 on the output lines 16 and 17, respectively, are applied to respective analog subtractor circuits 20 and 21. A second signal for each of subtractor circuits 20 and 21 is derived from the outlet line transducer 9. Thus, the output signal on line 18 from transducer 9 is applied to both of the subtractor circuits 20 and 21. The output signal from the first subtractor circuit 20 is amplified by an amplifier 22 and applied across a first coefficient potentiometer 23. Similarly, the output signal from the second subtractor circuit 21 is amplified by an amplifier 24 and is applied across a second coefficient potentiometer 25. The signals from the sliders of the potentiometers 23 and 25 are summed by a summing amplifier 26 and are applied to an analog dividing circuit 27 to be divided into the signal from the slider of the first potentiometer 23. The output signal from the divider 27 is applied as a control signal on line 28 to the valve controller 13.

In operation, the apparatus of the present invention is effective to control the proportion of two inlet fluids comprising a product, or outlet, fluid. This control operation is effected by measuring the temperatures of the inlet and outlet fluids and computing an existing ratio which is compared with the desired ratio. In many blending applications fluids having widely different temperatures are mixed to form a product having a desired ratio of the component fluids. For example, asphalt having a temperature range of 250° F. to 350° F. is blended with a solvent having a temperature range of 50° F. to 150° F. to form a product known as road oil. The ratio of the asphalt to the solvent is varied to produce road oils having different specific properties. In order to simplify this ratio control, it is desirable to eliminate a direct measurement of the flow rate. The present invention is directed toward an apparatus for controlling the ratio of the component fluids in a blended product which is based solely on a temperature measurement of the inlet and outlet fluids. The operation of the present invention is based on a temperature relationship between the fluids and the known specific heat of the inlet fluids which is derived as follows:

The general relationship of the weight and temperatures of the fluids assuming the incoming fluids have the same specific heat may be expressed by:

(1) $$W_a T_a + W_c T_c = W_p T_p$$

where:

$W_a$=weight of fluid A in blend $T_a$ = temperature of fluid
$W_c$ = weight of fluid C in blend
$T_c$ = temperature of fluid C before blending
$W_p$ = weight of product fluid
$T_p$ = temperature of product fluid In order to eliminate the weights of the fluids involved, divide both sides by the sum — $W_A + W_C$ (2) $$\frac{W_A}{W_A+W_C}T_A + \frac{W_C}{W_A+W_C}T_C = \frac{W_P}{W_A+W_C}T_P$$

since
$$W_p = W_A + W_c$$
$$\frac{W_P}{W_A+W_C} = 1$$

and
$$\frac{W_A}{W_A+W_C} = \text{Ratio}_A; \quad \frac{W_C}{W_A+W_C} = \text{Ratio } C$$

Substituting in 2

(3) $$R_A T_A + R_c T_c = T_p$$

since
$$R_A + R_c = 1$$
$$R_c = 1 - R_A$$

Substituting in 3 and solving for $R_A$;

(4) $$R_A = \frac{T_P - T_C}{T_A - T_C}$$

If the specific heats of the fluids are different, then the relationship is used that the specific heat of the product fluid is determined in proportion to the quantity of each component fluid and its specific heat, as follows:

(5) $$W_A C_A + W_c C_c = W_p C_p$$

where:
$C_A$ = specific heat of fluid A
$C_c$ = specific heat of fluid C
$C_p$ = specific heat of fluid P solving for $C_p$;
$$C_P = \frac{W_A C_A + W_C C_C}{W_P}$$

since
$$W_p = W_A + W_c$$

(6) $$C_P = \frac{W_A C_A + W_C C_C}{W_A W_C}$$

$$C_P = \frac{W_A}{W_A+W_C}C_A + \frac{W_C}{W_A+W_C} + C_C$$

Substituting the ratio definitions;

(7) $$C_p = R_A(C_A - C_c) + C_c$$

Substituting (7) into the general equation form of (1) which is:

(8) $$W_A T_A C_A + W_c T_c C_c = W_p T_p C_p$$

and dividing by
$$W_A + W_c$$

yields:
$$R_A T_A C_A + T_c C_c - R_A T_c C_c = T_p R_A (C_A - C_c) + T_p C_c$$

Solving for $R_A$ produces;

(9) $$R_A = \frac{(T_C - T_P)C_C}{(T_C - T_P)C_C} + (T_P - T_A)C_A$$

Equation 9 is continuously solved by the ratio computer of the present invention to produce a computed ratio signal for the valve controller 13 as a representation of the existing ratio, or percent, of the controlled fluid in the product fluid. The controller 13 is effective to vary the amount of controlled fluid to be admitted by the valve 12 into the mixing junction 7 as a function of the computed control signal suplied by computer 15. The manual valve 11 can be used to initially set the flow of the uncontrolled fluid to produce an approximate initial volume of the product fluid.

The temperature signals from the transducers 3, 5 and 9 are applied to subtractors 20 and 21 as noted supra. These signals are subtracted to yield the two required differences of $T_c - T_p$ and $T_p - T_A$ from subtractors 21 and 20, respectively. These difference signals are multiplied by the specific heat coefficients which are determined by the setting of multiplying potentiometers 23 and 25. The output signals of the potentiometers are summed by summing means 26 supplied to divider 27. The output signal of potentiometer 25 is also supplied to divider 27. The summed signal is divided into the output of potentiometer 25, which is $(T_c - T_p)C_c$, to produce an output on line 28 equal to $R_A$. In the case of asphalt blending, the product road oil in line 8 is controlled by the use of the present invention to control the amount of solvent which is introduced into the asphalt at the mixing junction 7 without the need to measure any actual flows in the system.

Accordingly, it may be seen that there has been provided in accordance with the present invention, a fluid blending system which is effective to detect and control the ratio of constituent fluids in a product fluid without the need for directly measuring any fluid flow and through a controlling action on one of the constituent fluids.

What is claimed is:

1. A fluid ratio blending system comprising, first constituent fluid conduit means, second constituent fluid conduit means, conduit junction means connected to said first and second conduit means and arranged to combine respective fluids carried by said first and second conduit means to form a product fluid, first temperature transducer means arranged to measure the temperature of a fluid in said first conduit, second temperature transducer means arranged to measure the temperature of a fluid in said second conduit means, a third temperature transducer means arranged to measure the temperature of said product fluid issuing from said junction means, valve means arranged to control a fluid flow in one of said first and second conduit means, and ratio computer means responsive to said first, second and third transducer means to compute a control-signal for said valve means to effect a ratio control of a fluid in the associated conduit means in said product fluid issuing from said junction means, said ratio computer means including difference means for detecting the relationship between said third transducer and each of said first and second transducers.

2. A fluid ratio blending system as set forth in claim 1 wherein said ratio computer is arranged to solve the following equation:

$$R_A = \frac{(T_C - T_P)C_C}{(T_C - T_P)C_C + (T_P - T_A)C_A}$$

where:

$T_c$ = temperature of a fluid in said first conduit means
$T_A$ = temperature of a fluid in said second conduit means
$T_p$ = temperature of a fluid issuing from said junction means
$C_c$ = specific heat of a fluid in said first conduit means
$C_A$ = specific heat of a fluid in said second conduit means
$R_A$ = Control signal representative of a ratio of said fluid in said second conduit in said product fluid.

3. In combination, first and second supply means, output means connected to each of said supply means, separate means for detecting a physical characteristic of the material supplied by said first and second supply means and said output means, said means for detecting providing signals representative of said physical characteristic, first comparator means connected to said first supply means and said output means via the associated means for detecting to provide a signal indicative of the relationship therebetween, second comparator means connected to said second supply means and said output means via the associated means for detecting to provide a signal indicative of the relationship therebetween, and ratio means connected to each of said first and second comparator means to produce a signal representative of a ratio relationship between the signals produced by said comparator means.

4. The combination recited in claim 3 wherein said comparator means each include subtractor means, and summing means connected to the output of each of said comparator means, said ratio means comprising divider means having one input connected to said summing means and a further input connected to one of said comparator means.

5. The combination recited in claim 3 wherein said combination includes attenuator means connected to the output of each of said subtractor means to control the output thereof.

6. The combination recited in claim 3 including separate valve means associated with each of said first and second supply means, at least one of said valve means being automatically controllably operated, and means for controlling said automatically controlled valve means as a function of the signal produced by said ratio means.

7. The combination recited in claim 3 wherein said means for detecting each comprise a temperature sensitive transducer, said comparators each including subtractor means such that the temperature at said output means is compared with the temperature at each of said input means, means for adding the signals produced by said subtractor means, arithmetic means for operating upon a signal from one of said subtractors means and the signal from said means for adding in order to provide a signal representative of the ratio thereof, and means for controlling one of said supply means as a function of the ratio indicated by said arithmetic means.

References Cited

UNITED STATES PATENTS 1,532,543    4/1925    Newcomb _____ 236—12

EDWARD J. MICHAEL, *Primary Examiner.*